United States Patent [19]

Norberg et al.

[11] Patent Number: 4,794,207
[45] Date of Patent: Dec. 27, 1988

[54] ELECTRICAL OUTLET UNIT FOR A BUILDING

[75] Inventors: Kenneth L. Norberg; Harold B. Henley, both of Watertown, S. Dak.

[73] Assignee: Enercept, Inc., Watertown, S. Dak.

[21] Appl. No.: 842,465

[22] Filed: Mar. 21, 1986

[51] Int. Cl.[4] .................................................. H02G 3/08
[52] U.S. Cl. ..................................... 174/48; 439/535; 174/53; 174/65 R; 220/3.3
[58] Field of Search .......... 339/94, 60, 122 R, 122 F, 339/164 R, 164 M, 123; 220/3.3, 3.94, 3.2; 174/48, 53, 58, 65 R

[56] References Cited

U.S. PATENT DOCUMENTS

| | | | |
|---|---|---|---|
| 1,454,722 | 5/1923 | Boutin | 220/3.92 |
| 1,839,250 | 1/1932 | Newman et al. | 220/3.8 |
| 3,137,763 | 6/1964 | Jones | 174/48 |
| 3,437,738 | 4/1969 | Wagner | 174/66 |
| 3,619,476 | 11/1971 | Rasmussen | 174/58 |
| 4,098,423 | 7/1978 | Marrero | 220/3.6 |
| 4,134,636 | 1/1979 | Kleinatland et al. | 174/58 |
| 4,163,137 | 7/1978 | Close, Jr. | 339/123 |
| 4,194,644 | 3/1980 | Narvaez | 220/3.3 |
| 4,265,365 | 5/1981 | Boteler | 220/3.3 |
| 4,297,525 | 10/1981 | Bowden, Jr. | 174/58 |
| 4,345,693 | 8/1982 | Balkwill | 220/3.3 |
| 4,408,695 | 10/1983 | Balkwill et al. | 220/3.8 |
| 4,484,021 | 11/1984 | Schaefer et al. | 339/94 A |
| 4,626,617 | 12/1986 | Rye | 174/53 |

FOREIGN PATENT DOCUMENTS

| | | | |
|---|---|---|---|
| 1101978 | 5/1981 | Canada | 174/53 |
| 1615851 | 10/1977 | Fed. Rep. of Germany | 174/53 |

*Primary Examiner*—David Pirlot
*Attorney, Agent, or Firm*—Merchant, Gould, Smith, Edell, Welter & Schmidt

[57] ABSTRACT

An electrical outlet unit (10) for receiving an electrical apparatus such as an electrical switch or plug-in, and method for installation thereof, for use in a building having an air and vapor barrier (14) disposed between the interior wall panel (16) and underlying frame (12) of the building's exterior wall. The electrical outlet unit (10) is adapted for sealing the opening cut in the air and vapor barrier (14) around the electrical outlet unit which projects therethrough, as well as providing a seal around the wires (28) inserted through the unit's wire access openings (24), for the purpose of minimizing the passage of air and vapor around or through such electrical outlet unit.

6 Claims, 2 Drawing Sheets

ELECTRICAL OUTLET UNIT FOR A BUILDING

TECHNICAL FIELD

The present invention is directed to an electrical outlet unit for receiving any electrical apparatus such as an electrical switch or plug in, and method for installation thereof, for use in a building having an air and vapor barrier material disposed between the interior wall panel and underlying frame of the building's exterior wall to which such electrical outlet unit is attached.

BACKGROUND OF THE INVENTION

The importance of maintaining an effective air and vapor barrier within the exterior walls of a building, particularly in colder climates where the outside environment's temperature and relative humidity levels are typically much lower than those desired on the inside of the building, has long been appreciated. It has been found, for example, that the exterior walls of older buildings, typically consisting of a frame with only wall panel material such as plaster or sheetrock on the interior side thereof, and conventional siding or bricking material on the exterior, even with insulation therebetween, generally provide a relatively poor barrier to the exchange of air and vapor between the outside and inside of the building.

In an effort to minimize such air and vapor exchange, over the past several years much of the new construction incorporates a thin sheet of plastic material, commonly referred to as "air and vapor barrier", disposed between the interior wall panel and underlying frame of a building's exterior walls. Also, as the energy costs required for heating buildings have increased over recent years, new construction continues to include more energy efficient doors and windows and improved types of insulation.

Despite the use of such improved building materials, however, it is found that a substantial amount of cold air continues to enter the building, and heated air and humidity escapes therefrom, through the various openings cut in the interior wall panel and underlying air and vapor barrier of the building's exterior walls at those locations where electrical outlet boxes, containing electrical switches or plug-ins, are mounted. Part of the air and vapor leakage typically occurs through the electrical outlet unit itself, primarily through the various wire access holes which are provided in the sides of the electrical outlet box for insertion of electrical wiring to be connected to electrical apparatus mounted therein, and part of the air and vapor leakage also occurs around the outside of the electrical outlet box due to the fact that there is typically no seal between the air and vapor barrier opening and the electrical outlet box inserted therethrough.

Electrical outlet boxes are typically installed in alignment with an opening in a wall panel, with the box fastened to a stud or other structural member of the building's frame. When such electrical outlet boxes are installed on exterior walls, an aligned opening approximately the size of the forward opening of the electrical outlet box is cut in the air and vapor barrier and interior wall panel. Since there has not heretofore been a means available for providing a seal between the outside periphery of such an electrical outlet box and the air and vapor barrier and interior wall panel through which such box is mounted, a substantial leakage of air and vapor occurs. Furthermore, since a building typically has several such electrical outlet units distributed throughout several locations of its exterior walls, the cumulative loss of heat and humidity during a given period of cold weather can be significant, resulting in much higher energy costs for heating and making the environment within such a building generally uncomfortable.

Thus, there is a need for an improved electrical outlet unit for installation in a building's exterior wall, which will provide a seal around the periphery of said unit with the air and vapor barrier in said wall, as well as a seal around the electrical wires which pass through the wire access openings of said unit, so as to minimize the exchange of air and vapor between the inside and outside of such building's exterior wall.

SUMMARY OF THE INVENTION

The present invention is directed to a new and improved electrical outlet unit, and method for installation thereof, in a building having an air and vapor barrier material disposed between the interior wall panel and underlying frame of the building's exterior wall to which such unit is attached, such unit being adapted to provide a seal around the periphery of said unit and the opening cut in the air and vapor barrier through which said unit projects, as well as a seal around the electrical wires which pass through the wire access openings of said unit, for the purpose of minimizing the passage of air and vapor around or through such electrical outlet unit.

In general, the present electrical outlet unit comprises an electrical wiring box having a forward box opening to receive an electrical apparatus, which is fastened to a stud or other structural member of the exterior wall of the building, typically by nailing the wiring box to the stud. The electrical outlet unit also includes a separate projecting retainer collar which is assembled together with such electrical wiring box to clamp therebetween the air and vapor barrier material, typically a thin sheet of plastic, to prevent passage of air and vapor around such assembled electrical outlet unit. The electrical wiring box is provided with an integral flange disposed peripherally about the forward opening of the box, on which the projecting retainer collar is mounted, thereby forming an annular seal with the air and vapor barrier clamped between the wiring box and retainer collar. The retainer collar includes interconnecting side walls which generally define a channel having an internal opening at the forward and rearward ends thereof, such internal opening being approximately the same size and configuration as that formed by the forward opening of the wiring box, and the side walls of the retainer collar being of suitable forward length to project through the opening cut in the interior wall panel.

The wiring box is provided with at least one wire access knock-out opening through which electrical wires are inserted for connection to the electrical apparatus installed therein. Each wire access knock-out opening includes a thin layer of material over the opening which is readily pierced at the time of installation of the wire. Wire access closure members are provided for mounting over the wire access openings, which closure members are preferably made of deformable material, such as a foamed plastic or rubber, such closure members also having suitable openings therein, for example formed by intersecting slits, which will achieve a close fit around the electrical wires inserted therethrough for the purpose of minimizing the passage of air and vapor through the wire access openings of the electrical wiring box.

More particularly, in the preferred embodiment, the electrical wiring box is defined by a structure having a back wall and interconnecting side walls which extend forwardly from the back wall to define a forward opening to receive an electrical apparatus. The forward opening generally defines a plane, and an integral flange having a flat surface generally parallel to said plane is secured peripherally about the forward opening of the wiring box. Mechanism for fastening the electrical wiring box to the wall stud include integral ears having holes aligned on opposite sides of the box through which nails may be inserted for mounting the wiring box to the wall stud. The retainer collar comprises a stucture having interconnecting side walls which define a channel having an internal opening at each end of approximately the same size and configuration as that formed by the forward opening of the wiring box, with the rearward opening of such retainer collar generally defining a plane, and also including an integral flange having a flat surface generally parallel to said plane which is secured peripherally about the rearward opening of the retainer collar.

In the preferred embodiment, mechanism is provided for aligning the assembly of the retainer collar to the wiring box for proper horizontal and vertical registration of the rearward opening of the retainer collar to the forward opening of the wiring box. As illustrated in FIG. 1, such alignment mechanism includes a pair of protruding stems, which are integrally formed to the inside of opposing side walls of the wiring box and forwardly protrude slightly beyond the wiring box flange, as well as a pair of forwardly converging guiding ridges, which are integrally formed at suitable locations to the inside of opposing sides of the retainer collar for receiving the stems of the wiring box, thereby aligning the assembly of the retainer collar to the wiring box.

As further shown in the preferred embodiment, additional mechanism for alignment of the retainer collar and wiring box, as well as the means for fastening the retainer collar and wiring box together, comprise holes which are suitably positioned in opposite sides of the retainer collar flange and the wiring box flange, each of the holes in the wiring box flange further having a bore for receiving a screw which is inserted through the corresponding hole in the retainer collar flange. If desired, a gasket having a size and configuration approximately the same as that of the retainer collar flange and wiring box flange, preferably being made of deformable material such as foamed plastic or rubber, may be included on either or both sides of the air and vapor barrier to provide an improved annular seal therebetween.

A new and improved method for installing an electrical outlet unit to the frame of an exterior wall of a building, over which frame an air and vapor barrier and interior wall panel are subsequently mounted, in accordance with the present invention, involves the following steps:

(a) Attaching a wire access closure member over each wire access opening provided in the electrical wiring box;

(b) Fastening the electrical wiring box to the structural member of the building's frame, such as a stud;

(c) Inserting into the electrical wiring box the electrical wires required for the electrical apparatus to be installed therein, by inserting such wires through the opening provided in each wire access closure member and corresponding wire access opening provided in the electrical wiring box;

(d) Mounting the air and vapor barrier material over the interior side of the building's frame thereby covering each of the underlying electrical wiring boxes fastened to such building's frame;

(e) Assembling the retainer collar to the electrical wiring box by mounting the retainer collar upon the air and vapor barrier and underlying electrical wiring box, and securing the retainer collar and wiring box together by suitable fastening mechanism thereby clamping the air and vapor barrier therebetween;

(f) Cutting a hole in the interior wall panel of approximately the same size and configuration as that defined by the outside dimensions of the forward end of the projecting retainer collar;

(g) Mounting the interior wall panel over the underlying air and vapor barrier and frame of the building's wall structure; and (h) Cutting a hole in the air and vapor barrier of approximately the same size and configuration as that defined by the interior dimensions of the forward end of the projecting retainer collar and attached electrical wiring box to access such electrical outlet unit.

The present invention is simple, and thus, can be manufactured inexpensively and made available to the vast majority of the public. Despite its simplicity, however, the electrical outlet unit has incorporated features which the prior art never considered. This fact is surprising but leads to the significance of the invention.

In addition to these features, other features and objects obtained by the invention are more fully explained hereinafter by reference to drawings of the preferred embodiment and descriptive matter relative thereto. In considering the disclosure, it should be understood that the embodiments disclosed are representative of the inventive concept and that only the claims limit the extent of the invention.

BRIEF DESCRIPTION OF THE DRAWINGS

A more complete understanding of the invention may be had then by reference to the following Detailed Description of the Preferred Embodiment when taken in conjunction with the accompanying drawings, wherein.

DETAILED DESCRIPTION OF THE PREFERRED EMBODIMENT

Figure 1:
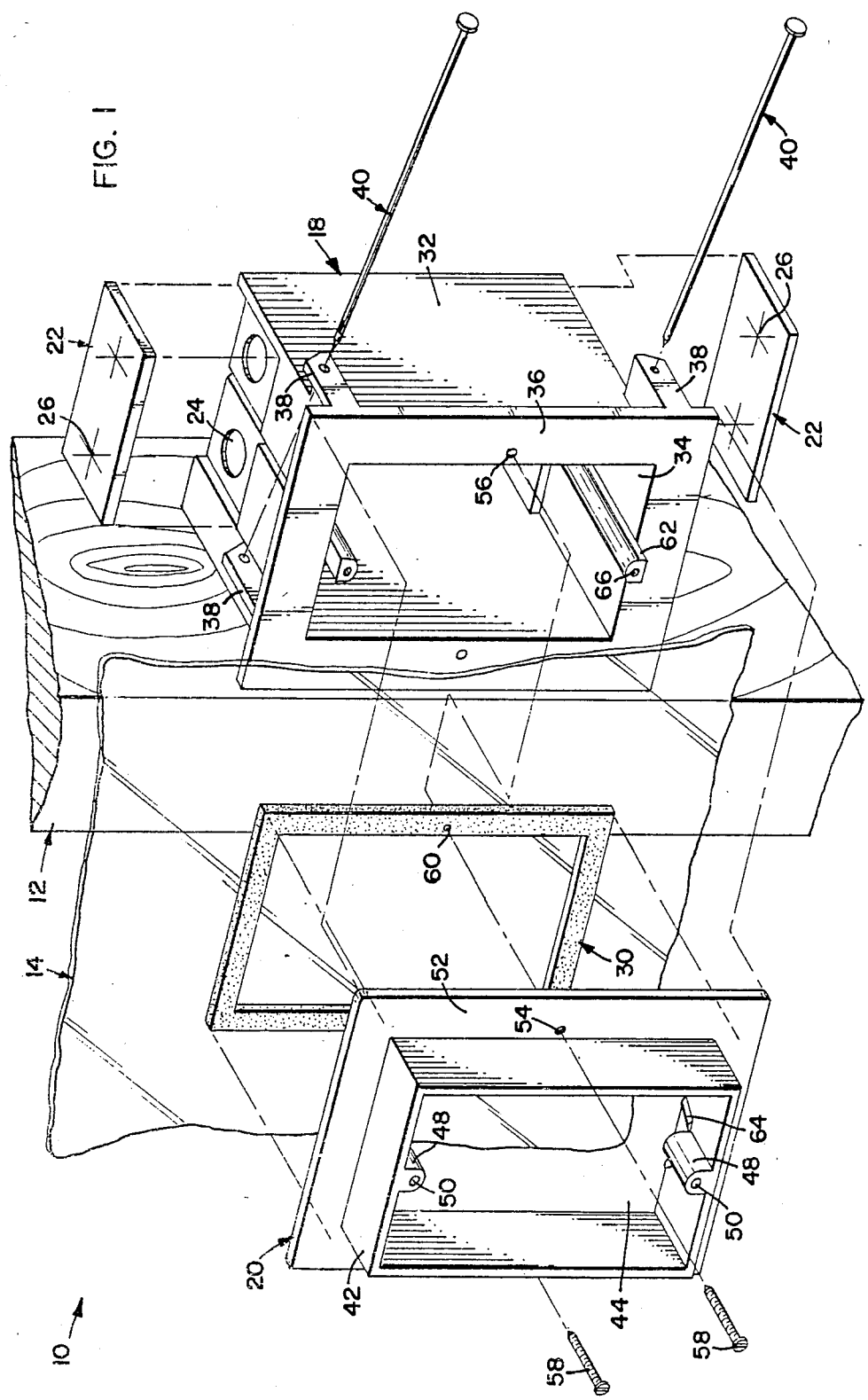
FIG. 1 is an exploded perspective view of one embodiment of the electrical outlet unit in accordance with the present invention.

Referring now to the drawings, wherein like reference numerals designate like or corresponding parts throughout the several views, and more particularly referrig to FIG. 1, an electrical outlet unit in accordance with the invention is designated generally by the numeral 10, for attachment to a stud 12 or other structural member of a frame of a building, such building's frame also having an air and vapor barrier 14, typically comprising a thin sheet of plastic material, such air and vapor barrier being installed between the building's frame and overlying interior wall panel 16, such as sheetrock. The electrical outlet unit 10 includes a separate electrical wiring box 18 which is fastened to the stud 12, and a separate projecting retainer collar 20, which are assembled to clamp the air and vapor barrier 14 therebetween, thereby minimizing the passage of air and vapor around the assembled electrical outlet unit 10. The electrical outlet unit 10 also includes a wire access closure member 22 which is mounted over each wire access opening 24 provided in the electrical wiring box 18, such wire access closure member 22 having a suitable opening such as intersecting slits 26 to provide a close fit around electrical wires 28 inserted therethrough, thereby minimizing the passage of air and vapor through the assembled electrical outlet unit 10. In addition, a gasket 30 is shown for installation between the air and vapor barrier 14 and the retainer collar 20. It is understood that the particular shape of electrical outlet unit 10 is not critical to the practice of the invention, and may comprise a variety of shapes and sizes which are most suitable for the electrical apparatus being installed in the building's wall.

The electrical wiring box 18 includes a back wall 30 and interconnecting side walls 32 which extend forwardly from the back wall 30 to define a forward opening 34 for receiving an electrical apparatus. As illustrated in FIG. 1, the forward opening 34 generally defines a plane, and an integral wiring box flange 36 having a flat surface generally parallel to said plane is secured peripherally about the forward opening 34 of said electrical wiring box 18. As further shown in FIG. 1, mechanism for fastening the electrical wiring box 18 to the stud 12 includes a pair of ears 38 integrally formed on opposing sides at the upper and lower ends of the electrical wiring box 18, such ears having holes provided therein for insertion of a fastening nail 40 through each pair of the respective upper and lower pairs of ears, such that the fastening nails do not penetrate the inside of the electrical wiring box 18. A pair of spaced apart standoff members 39 extend rearwardly from flange 36 along a sidewall 32. Members 39 are preferably flush with the outer edge of flange 36 so it does not interfere with stud 12. It is understood that the illustrated fastening mechanism is only representative of one type of fastening mechanism which may be used and that many other types of fastening mechanisms are possible.

Figure 2:
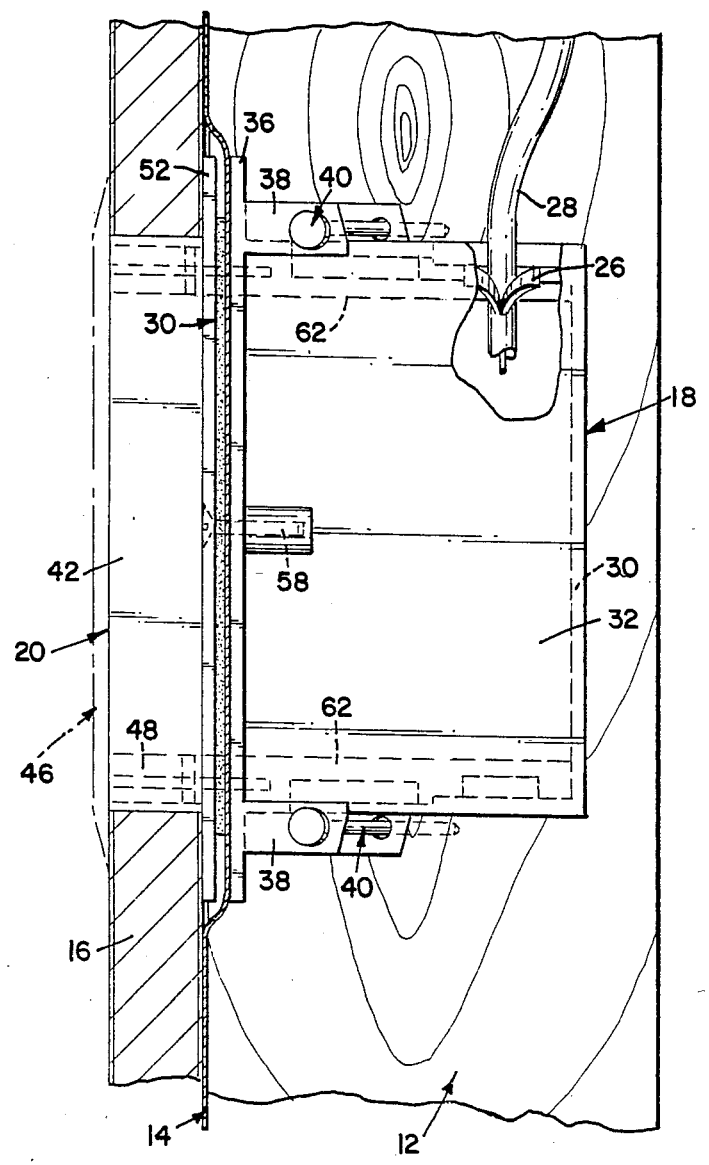
FIG. 2 is a side elevational view of the electrical outlet unit as installed to a building frame member and with a portion broken away to show a wire passing through an access closure member.

The projecting retainer collar 20 as illustrated in the accompanying drawings, includes interconnecting side walls 42 which generally define an internal channel having an internal opening at the forward and rearward ends thereof of approximately the same size and configuration as that formed by the forward opening 34 of the electrical wiring box 18. For example, the rearward opening 44 is desirably the same size and shape as that of the forward opening 34 of the electrical wiring box 18. The side walls 42 of the projecting retainer collar 20 are preferably of suitable forward dimension or length that the side walls 42 project a sufficient distance into the opening which is cut in the interior wall panel 16 to be placed thereover, such projecting retainer collar to preferably extend therethrough to a point which is approximately flush with the interior surface of the interior wall panel 16. As further illustrated in FIGS. 1 and 2, mechanism is provided for fastening an electrical outlet cover 46 to the electrical outlet unit 10 which includes a pair of mounting lugs 48 which are integrally formed to the inside channel of opposing side walls 42 of the retainer collar 20, each lug having a forwardly disposed hole 50 with a bore to receive a screw which has been inserted through a correspondingly positioned hole in a suitable electrical outlet cover 46. The rearward opening 44 of the retainer collar 20 generally defines a plane, and an integral retainer collar flange 52 having a flat surface generally parallel to said plane is secured to retainer collar 20 peripherally about the rearward opening 44 of the retainer collar 20.

As illustrated in the preferred embodiment shown in FIG. 1, mechanism for fastening together the retainer collar 20 and the electrical wiring box 18 includes holes 54 which are suitably positioned in opposite sides of the retainer collar flange 52, as well as correpsondingly positioned holes 56 which are positioned in opposite sides of the electrical wiring box flange 36, each of the holes 56 in the wiring box flange 36 further having a bore for receiving a screw 58, which is inserted through the corresponding countersunk hole 54 in the retainer collar flange 52. Preferably, a gasket 30 having a size and configuration approximately the same as that of the retainer collar flange 52 and wiring box flange 36 and preferably being made of deformable material such as foamed plastic or rubber is inserted between the air and vapor barrier 14 and adjacent retainer collar flange 52 or wiring box flange 36. It is in fact preferred that gasket 30 be adhesively attached to one of retainer collar flange 52 and wiring box flange 36. Suitable holes 60 are provided in the gasket 30 at locations corresponding with those provided in the retainer collar flange 52 and wiring box flange 36 through which the fastening screw 58 is inserted for proper alignment of the gasket 30. It is understood that the deformable materials comprising the gasket 30 preferably are resilient to the compressive stresses exerted between the retainer collar flange 52 and the wiring box flange 36, such that an effective seal is made around the air and vapor barrier 14 clamped therebetween, even in situations where the alignment of the assembled retainer collar flange 52 and wiring box flange 36 is less precise than, or the spaced tolerances therebetween somewhat exceed, those which are ordinarily desired.

As further illustrated in FIG. 1, mechanism is provided for aligning the assembly of the retainer collar 20 to the wiring box 18 for the purposes of proper horizontal and vertical registration of the rearward opening 44 of the retainer collar 20 to the forward opening 34 of the wiring box 18. Such alignment mechanism includes a pair of protruding stems 62 which are integrally formed to the inside of opposing side walls 32 of the wiring box 18 and forwardly protrude slightly beyond the wiring box flange 36, as well as a pair of forwardly converging guiding ridges 64, which are integrally formed at suitable locations to the inside of opposing sides 42 of the retainer collar 20 for receiving the wiring box stems 62, thereby aligning the retainer collar 20 and electrical wiring box 18 as assembly thereof is being made. As further illustrated in FIG. 1, a forwardly disposed hole 66 is provided in each of the protruding stems 62 of the wiring box 18, each of which is aligned with the corresponding hole 50 passing through each of the mounting lugs 48 of the retainer collar 20. Each of the holes 66 in the protruding stems 62 has a bore to receive a screw of suitable length which is inserted through the mutually aligned holes which are provided in the electrical outlet cover 46 and mounting lugs 48 and 50, for an improved alignment and more secure assembly of the retainer collar 20 to the wiring box 18.

It is noted that screws 58 fasten flanges 36 and 52 and gasket 30 together. A second set of screws (not shown in drawing) hold and electrical device to stems 62. Both sets of screws, however, function to securely clamp air and vapor barrier 14 between flanges 36 and 52. This is particularly the case when the screws are approximately equally spaced about the opening (i.e., openings 34 and 44) in device 10. In this regard the forward face of stems 62 is spaced from the rear face of plugs 48 to provide for drawing the two together to compress gasket 30 and clamp air and vapor barrier 14.

In use, the electrical wiring box 18 is fastened, such as by nailing, to a structural member of the exterior wall of a building's frame, such as a stud 12, and, if not previously attached during fabrication, the wire access closure members 22 are attached over each of the wire access openings 24 provided in the side walls 32 of the wiring box. Holes are punched in the covering layer of material of at least one wire access opening. After the desired number of electrical wires 28 have been inserted through the selected openings 26 provided in each wire access closure member 22 and the corresponding wire access opening 24 of the wiring box 18, the air and vapor barrier 14 is placed over the entire interior surface of the building's exterior wall frame, thereby covering the frame and each of the electrical wiring boxes 18 mounted thereto. Next, a gasket 30 and retainer collar 20 are placed onto the air and vapor barrier 14 and are fastened, such as by screws 58, to the underlying electrical wiring box 18, thereby clamping the air and vapor barrier 14 therebetween. The receiving holes 54 for screws 58 are countersunk so the interior wall panel 16 can fit flush against flange 52. A hole is then cut in the interior wall panel 16 of sufficient shape and size which provides a relatively close fit around the side walls 42 of the retainer collar 20 projecting therethrough. After the interior wall panel 16 has been mounted over the air and vapor barrier 14 and wall frame, an access hole is cut in the air and vapor barrier 14 which is exposed inside the assembled retainer collar 20 and wiring box 18 to permit the electrical wires 28 to be pulled out for connection to the electrical apparatus to be installed. An electrical device is assembled to wires 28 and attached at lugs 48 and stems 62 with screws. Finally, an electrical outlet cover 46 is fastened to the assembled electrical outlet unit 10.

What is claimed is:

1. An electrical outlet unit for receiving an electrical device, said electrical outlet unit for attachment to a stud or other structural member of a frame for a building, said building also having an air and vapor barrier and wall panel attached to said stud or other structural member, said air and vapor barrier being between said stud or other structural member and said wall panel, said wall panel and said air and vapor barrier having aligned access openings, said electrical outlet unit comprising:

a wiring box having a back wall and an interconnecting first side wall extending forwardly from said back wall defining a forward opening for receiving said electrical device, said forward opening being aligned with said access openings in air and vapor barrier and said wall panel, said wiring box including a first flange secured peripherally about said forward opening of said wiring box, said wiring box also including a wire access opening;

means for fastening said wiring box to said structural member;

a projecting retainer collar for mounting to said first flange of said wiring box, said retainer collar having an interconnecting second side wall defining a channel with a rearward opening of approximately the same size as said forward opening of said wiring box, said retainer collar including a second flange secured peripherally about said rearward opening of said channel of said second side wall;

means for fastening said second flange of said retainer collar to said first flange of said wiring box to clamp said air and vapor barrier therebetween; and one of said wiring box and said retainer collar including means for holding said electrical device to said one of said wiring box and said retainer collar; wherein said first and second flanges of said wiring box and said projecting retainer collar are assembled and attached together with said fastening means to clamp said air and vapor barrier therebetween to minimize passage of air and vapor from one side of said air and vapor barrier through or around said electrical outlet unit to the opposite side of said air and vapor barrier.

2. An electrical outlet unit according to claim 1, including a gasket member forming an annular seal between said first and second flanges.

3. An electrical outlet unit according to claim 1, including a wire access closure member for mounting over said wire access opening in said wiring box, said wire access closure member comprising deformable material having a slit for passage of wires therethrough and means for fastening said wire access closure member onto said wiring box, whereby a close fit is made by said wire access closure member around the wires entering said wiring box through said wire access opening to minimize passage of air and vapor therethrough.

4. An electrical outlet unit according to claim 1, including one of said wiring box and said collar means including means for alignment of said collar means with said wiring box.

5. An electrical outlet unit according to claim 4 wherein said alignment means includes a pair of stems which protrude from said wiring box through said forward opening and a pair of converging guiding ridges for each of said stems, said ridges being attached to said collar.

6. An electrical outlet unit according to claim 5 wherein said holding means includes a threaded opening in each of said stems for receiving a screw to hold said electrical device thereto.

* * * * *